US008932162B2

(12) United States Patent  
Emura et al.

(10) Patent No.: US 8,932,162 B2  
(45) Date of Patent: Jan. 13, 2015

(54) BICYCLE FRONT DERAILLEUR

(71) Applicant: Shimano Inc., Sakai, Osaka (JP)

(72) Inventors: Atsuhiro Emura, Sakai (JP); Yoshikazu Sugiyama, Sakai (JP)

(73) Assignee: Shimano Inc., Sakai (JP)

( * ) Notice: Subject to any disclaimer, the term of this patent is extended or adjusted under 35 U.S.C. 154(b) by 39 days.

(21) Appl. No.: 13/898,733

(22) Filed: May 21, 2013

(65) Prior Publication Data

US 2014/0349794 A1   Nov. 27, 2014

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/131 | (2010.01) |

(52) U.S. Cl.
CPC ..................... B62M 9/131 (2013.01)
USPC ............................................. 474/82; 474/80

(58) Field of Classification Search
CPC .. B62M 9/1242; B62M 9/126; B62M 9/1248; B62M 9/1342; B62M 9/127
USPC ........................................................ 474/80, 82
See application file for complete search history.

(56) References Cited

U.S. PATENT DOCUMENTS

| | | | | | |
|---|---|---|---|---|---|
| 4,226,130 | A | * | 10/1980 | Isobe | 474/82 |
| 4,529,395 | A | * | 7/1985 | Coue | 474/82 |
| 4,887,990 | A | * | 12/1989 | Bonnard et al. | 474/78 |
| 5,037,355 | A | * | 8/1991 | Kobayashi | 474/82 |
| 5,389,043 | A | * | 2/1995 | Hsu | 474/80 |
| 5,496,222 | A | * | 3/1996 | Kojima et al. | 474/80 |
| 5,607,367 | A | * | 3/1997 | Patterson | 474/80 |
| 5,620,384 | A | * | 4/1997 | Kojima et al. | 474/82 |
| 5,624,336 | A | * | 4/1997 | Kojima | 474/82 |
| 5,728,018 | A | * | 3/1998 | Terada et al. | 474/80 |
| 5,779,580 | A | * | 7/1998 | White et al. | 474/80 |
| 5,779,581 | A | * | 7/1998 | Fujii | 474/82 |
| 6,099,425 | A | * | 8/2000 | Kondo | 474/82 |
| 6,146,298 | A | * | 11/2000 | Nanko | 474/80 |
| 6,234,927 | B1 | * | 5/2001 | Peng | 474/82 |
| 6,482,115 | B2 | * | 11/2002 | Takachi | 474/80 |
| 6,629,903 | B1 | * | 10/2003 | Kondo | 474/82 |
| 6,923,740 | B2 | * | 8/2005 | Nanko | 474/82 |
| 6,962,544 | B2 | * | 11/2005 | Nanko | 474/80 |
| 7,189,173 | B2 | * | 3/2007 | Tsai et al. | 474/82 |
| 7,341,532 | B2 | * | 3/2008 | Ichida et al. | 474/70 |
| 7,438,657 | B2 | * | 10/2008 | Nakai et al. | 474/80 |
| 7,651,423 | B2 | * | 1/2010 | Ichida et al. | 474/80 |
| 7,677,998 | B2 | * | 3/2010 | Tetsuka | 474/82 |
| 7,722,486 | B2 | * | 5/2010 | Nanko | 474/80 |

(Continued)

*Primary Examiner* — Henry Liu
(74) *Attorney, Agent, or Firm* — Brennan C. Swain, Esq.; Jeffer Mangels Butler & Mitchell LLP

(57) ABSTRACT

A front derailleur that includes a fixing member that is configured to be fixed to a bicycle frame, a chain guide movable between a retracted position and an extended position with respect to the fixing member, a linkage mechanism coupling the chain guide to the fixing member, and a biasing member that biases the chain guide toward one of the retracted position and the extended position. The linkage mechanism includes a first link member that is pivotable with respect to the fixing member about a first axis and is pivotable with respect to the chain guide about a second axis that is positioned above the first axis when the fixing member is fixed to the bicycle frame. The biasing member is coaxially arranged around the second axis.

16 Claims, 7 Drawing Sheets

(56) References Cited

U.S. PATENT DOCUMENTS

| | | | |
|---|---|---|---|
| 7,914,407 B2 * | 3/2011 | Fukushima et al. | 474/82 |
| 7,963,871 B2 * | 6/2011 | Peh et al. | 474/82 |
| 8,303,443 B2 * | 11/2012 | Wickliffe et al. | 474/80 |
| 2003/0100393 A1 * | 5/2003 | Nanko | 474/80 |
| 2004/0005951 A1 * | 1/2004 | Tsai et al. | 474/80 |
| 2004/0127314 A1 * | 7/2004 | Nanko et al. | 474/80 |
| 2006/0258494 A1 * | 11/2006 | Auer | 474/80 |
| 2007/0093327 A1 * | 4/2007 | Florczyk | 474/80 |
| 2007/0135249 A1 * | 6/2007 | Nanko | 474/80 |
| 2007/0178998 A1 * | 8/2007 | Tetsuka | 474/80 |
| 2008/0004142 A1 * | 1/2008 | Nakai et al. | 474/80 |
| 2008/0167148 A1 * | 7/2008 | Siah | 474/80 |
| 2008/0182689 A1 * | 7/2008 | Fujii et al. | 474/82 |
| 2008/0300076 A1 * | 12/2008 | Fukushima et al. | 474/80 |
| 2010/0075788 A1 * | 3/2010 | Wickliffe et al. | 474/80 |
| 2010/0081527 A1 * | 4/2010 | Auer | 474/80 |
| 2011/0224037 A1 * | 9/2011 | Auer et al. | 474/82 |

* cited by examiner

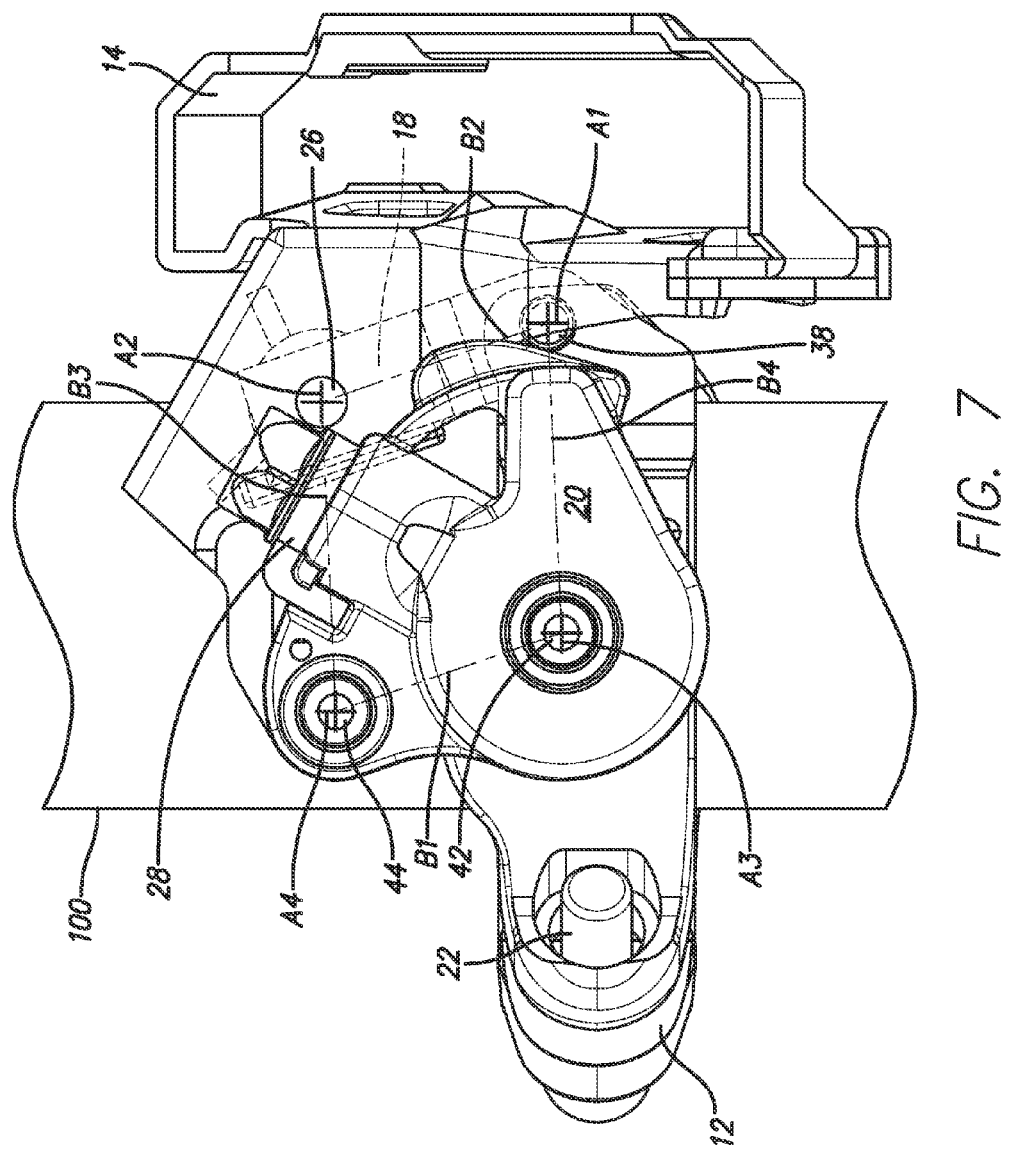

BICYCLE FRONT DERAILLEUR

FIELD OF THE INVENTION

The present invention relates to a bicycle front derailleur.

BACKGROUND OF THE INVENTION

Bicycle front derailleurs are well known in the art and typically include a chain guide that moves the chain from one chain ring (sprocket) to another chain ring in response to the rider's operation. For example, see U.S. Pat. No. 7,438,657 to Nakai, the entirety of which is incorporated herein by reference. There exists a need for an improved bicycle front derailleur.

SUMMARY OF THE PREFERRED EMBODIMENTS

In accordance with a first aspect of the present invention there is provided a front derailleur that includes a fixing member that is configured to be fixed to a bicycle frame, a chain guide movable between a retracted position and an extended position with respect to the fixing member, a linkage mechanism coupling the chain guide to the fixing member, and a biasing member that biases the chain guide toward one of the retracted position and the extended position. The linkage mechanism includes a first link member that is pivotable with respect to the fixing member about a first axis and is pivotable with respect to the chain guide about a second axis that is positioned above the first axis when the fixing member is fixed to the bicycle frame. The biasing member is coaxially arranged around the second axis. In a preferred embodiment, the first link member includes a first arm and a second arm that both extend between the first and second axes respectively. The biasing member is disposed between the first arm and the second arm. Preferably, the linkage mechanism includes a second link member that is pivotable with respect to the fixing member about a third axis and that is pivotable with respect to the chain guide about a fourth axis that is positioned above the third axis when the fixing member is fixed to a bicycle frame. The first link member and the second link member form a four bar linkage.

In a preferred embodiment, the first axis and the third axis lie in a first plane and the second axis and the fourth axis lie in a second plane. Preferably, the first plane is approximately perpendicular to a center axis of the bicycle frame when the fixing member is fixed to the bicycle frame. Further, the second plane is approximately perpendicular to the center axis of the bicycle frame when the fixing member is fixed to the bicycle frame. In a preferred embodiment, the second link member has a cable fixing portion. Preferably, the cable fixing portion is positioned between the second axis and the fourth axis in a generally horizontal direction. In a preferred embodiment, the first link member includes a stop member that is engaged by a first end of the biasing member and the biasing member biases the chain guide toward the retracted position.

In accordance with another aspect of the present invention there is provided a front derailleur that includes a fixing member that defines a fixing member axis and that is configured to be fixed to a bicycle frame, a chain guide movable between a retracted position and an extended position with respect to the fixing member, a linkage mechanism coupling the chain guide to the fixing member, and a biasing member that biases the chain guide toward one of the retracted position and the extended position. The linkage mechanism includes a first link member that is pivotable with respect to the fixing member about a first axis and that is pivotable with respect to the chain guide about a second axis that is positioned above the first axis when the fixing member is fixed to the bicycle frame. The first link member has a first arm and a second arm that both extend between the first and second axes respectively. The biasing member is disposed between the first arm and the second arm and coaxially around one of the first axis or the second axis.

In a preferred embodiment, the linkage mechanism further includes a second link member that is pivotable with respect to the fixing member about a third axis and that is pivotable with respect to the chain guide about a fourth axis that is positioned above the third axis when the fixing member is fixed to a bicycle frame. The first link member and the second link member form a four bar linkage. Preferably, the first axis and the third axis lie in a first plane and the second axis and the fourth axis lie in a second plane. The first and second planes are preferably approximately perpendicular to the center axis of the bicycle frame when the fixing member is fixed to the bicycle frame.

The invention, together with additional features and advantages thereof, may be best understood by reference to the following description.

BRIEF DESCRIPTION OF THE DRAWINGS

FIG. 7 is a rear elevational view of the bicycle derailleur of FIG. 1.

Like numerals refer to like parts throughout the several views of the drawings.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position.

Figure 1:
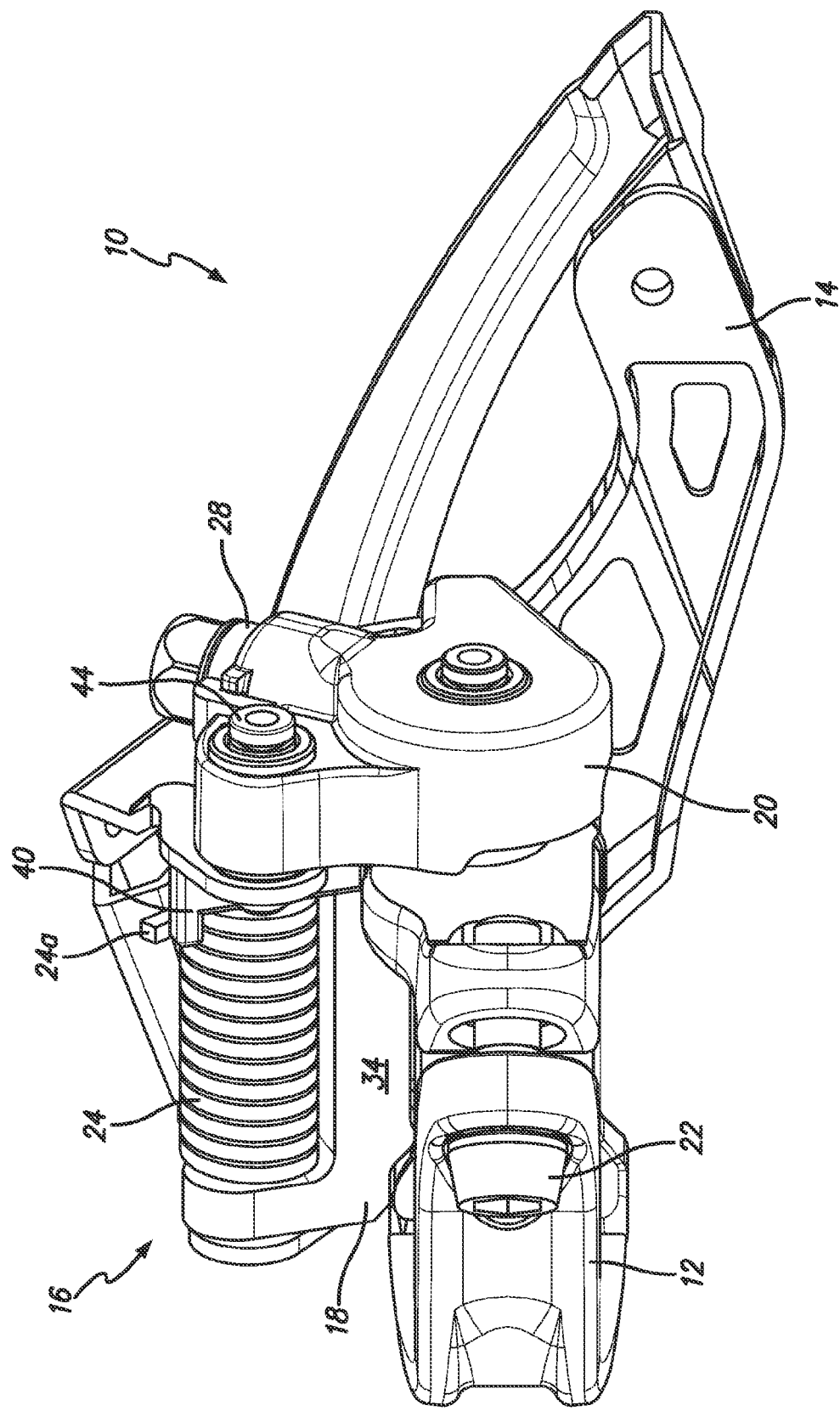
FIG. 1 is a perspective view of a bicycle derailleur in accordance with a preferred embodiment of the present invention.
Figure 2:
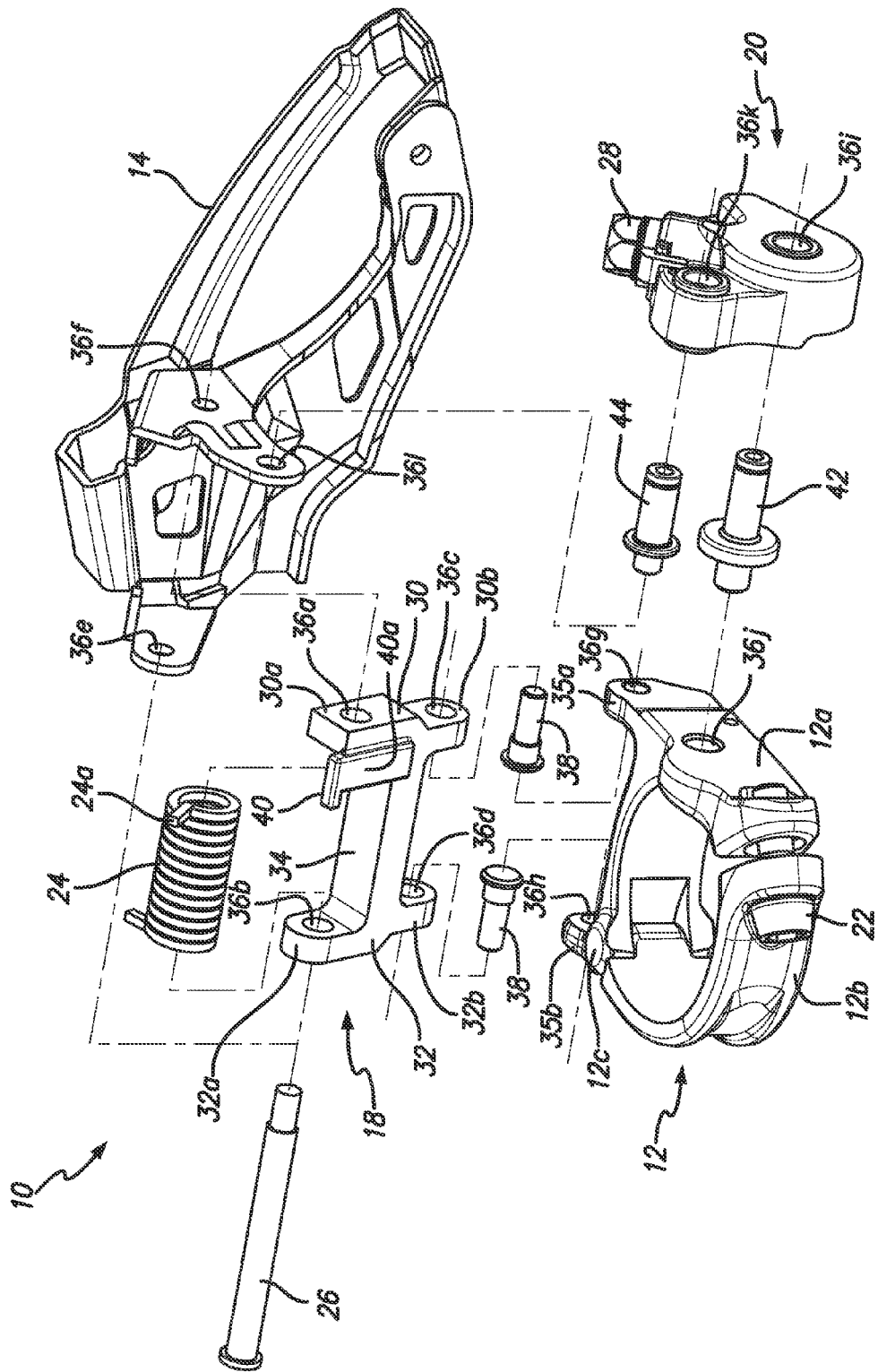
FIG. 2 is an exploded perspective view of the bicycle derailleur of FIG. 1.
Figure 3:
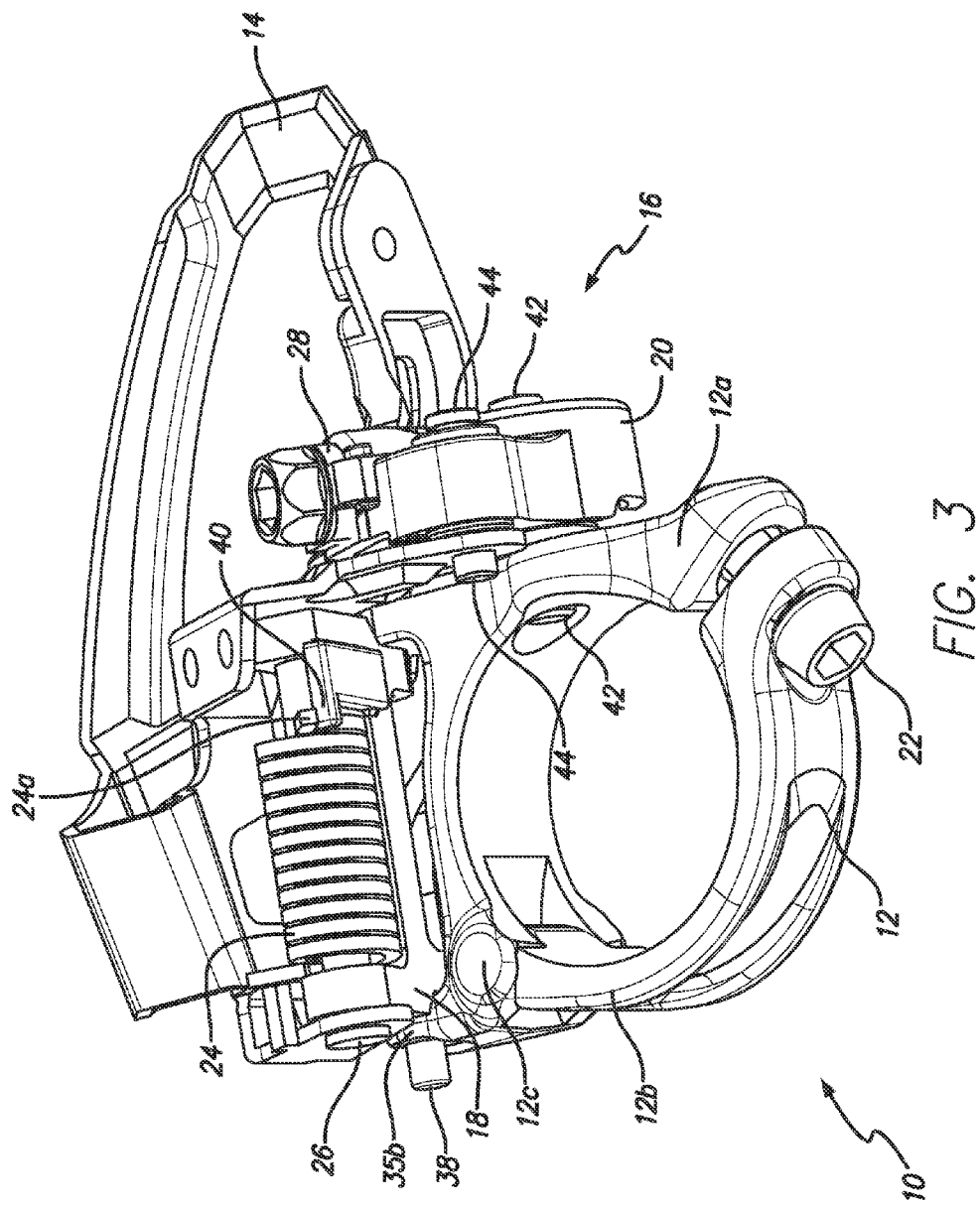
FIG. 3 is another perspective view of the bicycle derailleur of FIG. 1.

Referring to FIGS. 1-7 a bicycle front derailleur 10 generally comprises a fixing member 12 that is configured to be fixed to a bicycle frame, a chain guide 14 guiding a chain (not shown), and a linkage mechanism 16 coupling the chain guide 14 to the fixing member 12. The fixing member 12 is preferably a tubular clamp member or device that can be clamped or otherwise fixed to the bicycle frame, and preferably a seat tube 100 of the bicycle frame (see FIG. 7). However, it should be understood that the front derailleur 10 can be installed or fixed to other portions of the bicycle such as the bottom bracket, as necessary or desired. In a preferred embodiment, the fixing member 12 is preferably directly clamped to the seat tube 100 of the bicycle frame. As shown in FIG. 2, the fixing member 12 includes a first clamp part 12a, a second clamp part 12b, a pivot pin 12c, and a fastener 22. However, this is not a limitation on the present invention and any fixing member 12 that fixes the derailleur 10 to a bicycle is within the scope of the present invention. Accordingly, the term "fixing member" used herein includes any structure suitable for fastening to the seat tube 100 and/or bicycle in an immovable condition.

Figure 5:
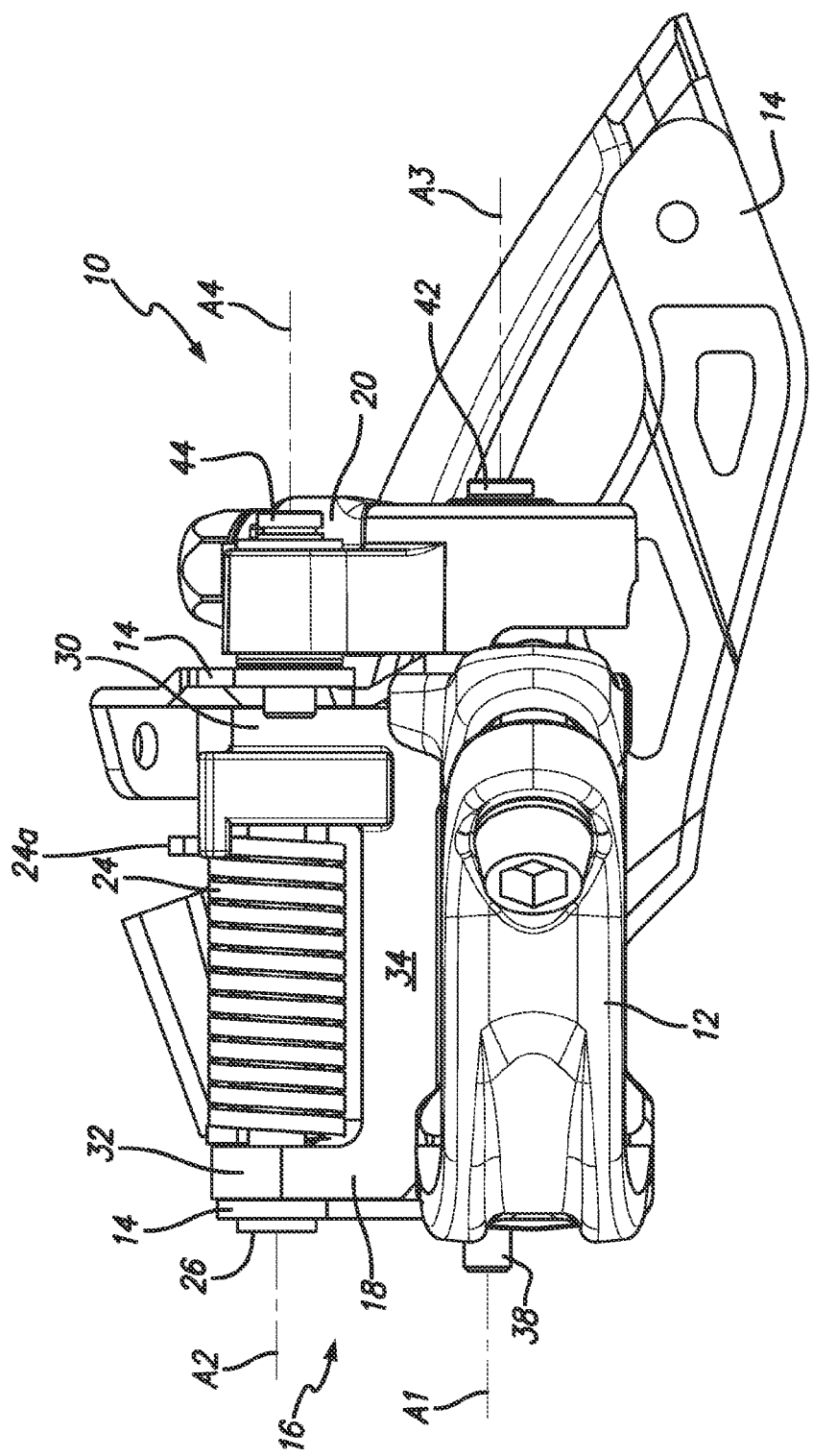
FIG. 5 is a side elevational view of the bicycle derailleur of FIG. 1.
Figure 6:
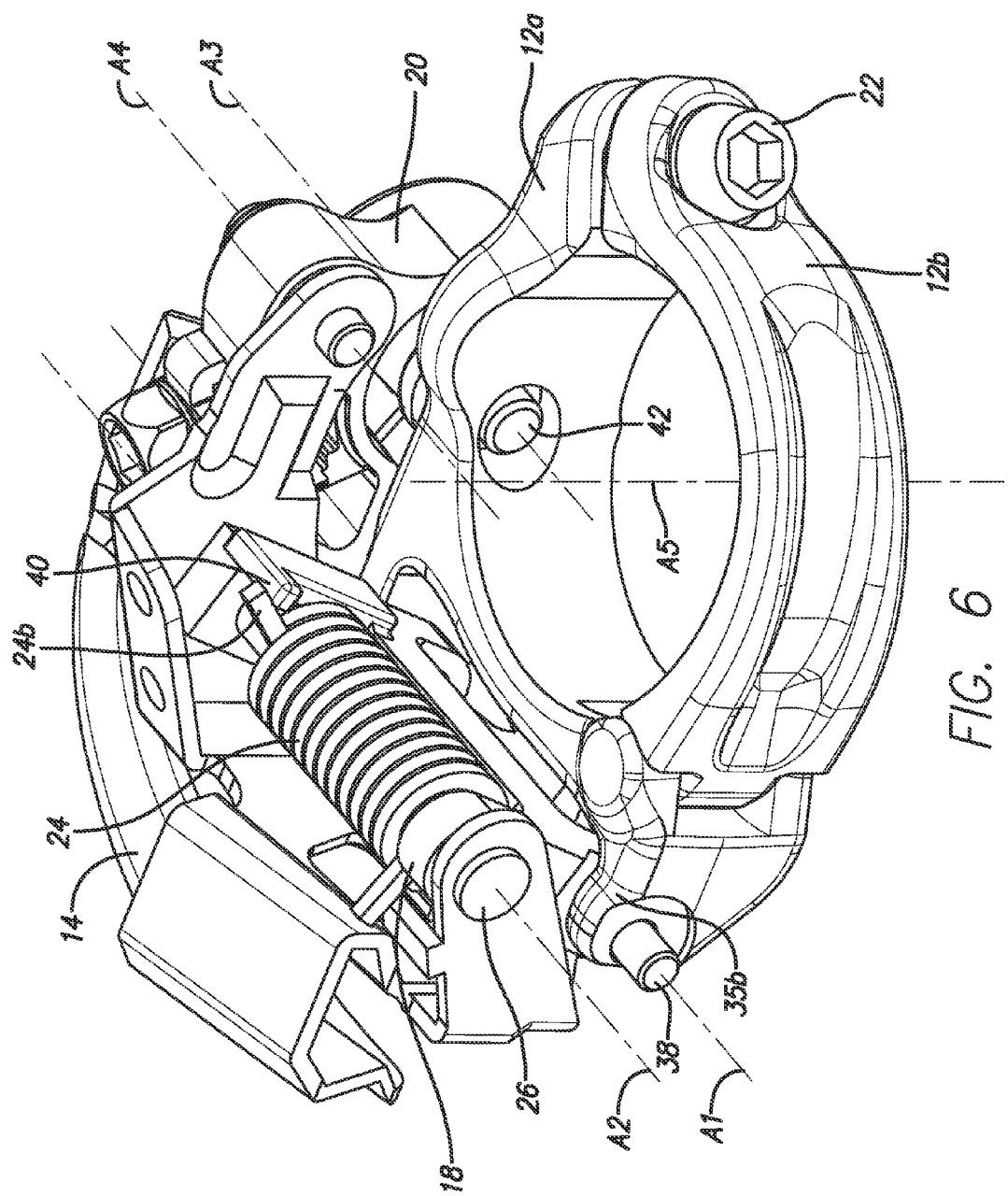
FIG. 6 is another perspective view of the bicycle derailleur of FIG. 1.

In a preferred embodiment, the chain guide 14 is movable between a retracted position and an extended position with respect to the fixing member 12. As is known in the art, when the front derailleur 10 is mounted on the bicycle frame, the action of the chain guide 14 moves the chain to different chain ring(s) of a chain ring assembly for shifting purposes. The linkage mechanism 16 couples the chain guide 14 to the fixing member 12. The linkage mechanism 16 includes a first link member 18. Preferably, the linkage mechanism 16 also includes a second link member 20. As shown in FIGS. 5-7, in a preferred embodiment, the first link member 18 is pivotable with respect to the fixing member 12 about a first axis A1 and is pivotable with respect to the chain guide 14 about a second axis A2. As shown in FIG. 5, in a preferred embodiment, the second axis A2 is positioned above the first axis A1 when the fixing member 12 is fixed to the seat tube 100 of the bicycle frame.

In a preferred embodiment, the linkage mechanism 16 includes a biasing member 24 (e.g., a torsion spring) that biases the chain guide 14 toward one of the retracted position and the extended position. In a preferred embodiment, the biasing member biases the chain guide 14 toward the fixing member 12. Namely, the biasing member 24 biases the chain guide 14 toward the retracted position. The biasing member 24 is coaxially arranged around the second axis A2. Preferably, the linkage mechanism 16 includes a pivot pin 26 that extends through the center of the torsion sprint 24.

As shown in FIGS. 5-7, in a preferred embodiment, the linkage mechanism 16 further includes a second link member 20 that is pivotable with respect to the fixing member 12 about a third axis A3 and is pivotable with respect to the chain guide 14 about a fourth axis A4. In a preferred embodiment, the fourth axis A4 is positioned above the third axis A3 when the fixing member 12 is fixed to the seat tube 100 of the bicycle frame. It will be appreciated by those of skill in the art that the first link ember 18 and second link member 20 together form a four bar linkage. As shown in FIG. 1, in a preferred embodiment, the second link member 20 includes a cable fixing portion 28. As shown in FIG. 7, in a preferred embodiment, the cable fixing portion 28 is positioned between the second axis A2 and the fourth axis A4 in a generally horizontal direction. However, this is not a limitation the present invention.

Figure 4:
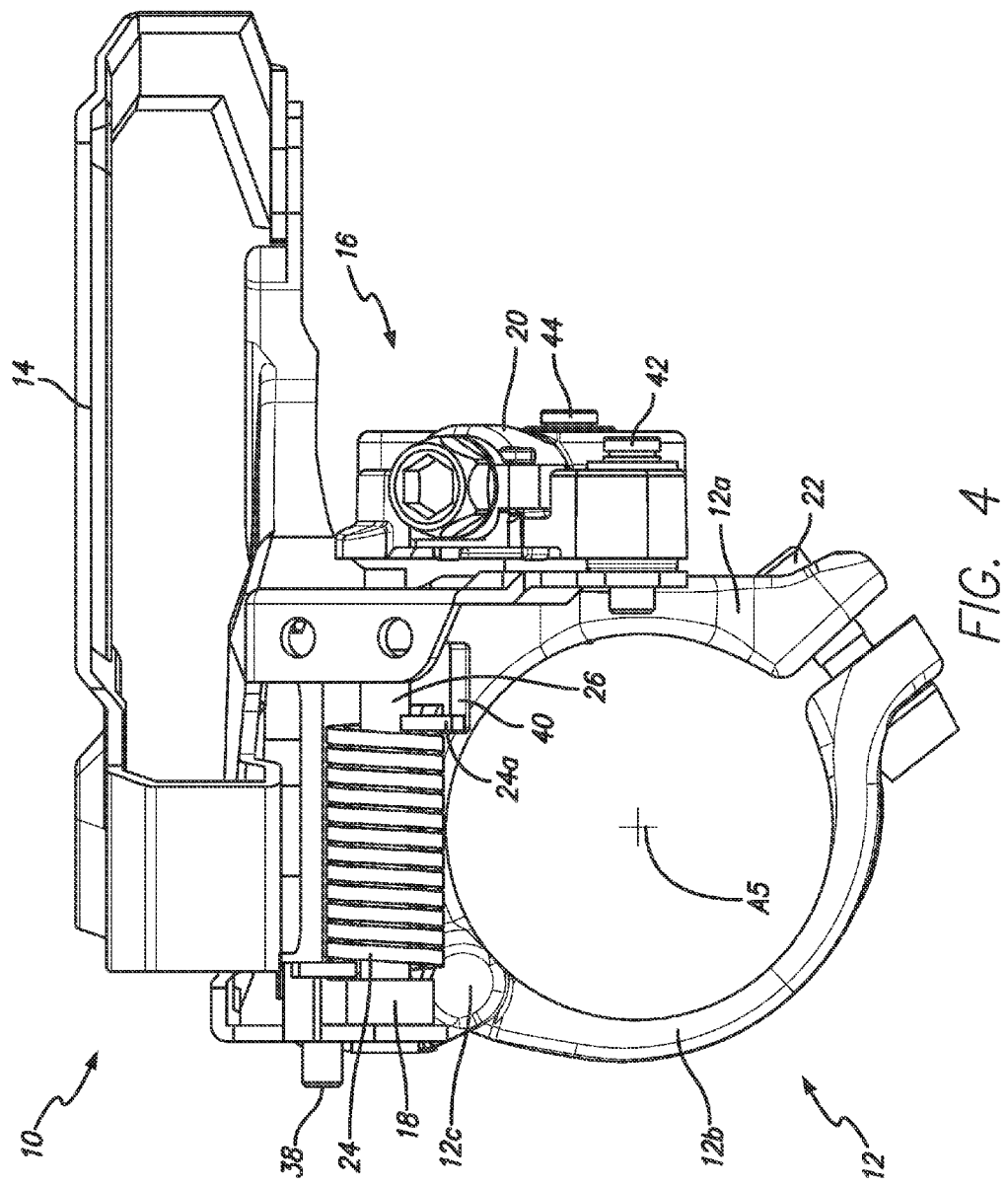
FIG. 4 is a top plan view of the bicycle derailleur of FIG. 1.

In operation, the second link member 20 rotates about the third axis A3, which is approximately perpendicular and spaced apart from an axis defined by the fixing member 12 (referred to herein as the fixing member axis A5 and shown in FIGS. 4 and 6). It will be appreciated that the third axis A3 extends through the seat tube 100 when the front derailleur 10 is fixed to the seat tube 100. The first link member 18 rotates bout the first axis A1. In a preferred embodiment, the first and third axes A1 and A3 are fixed with respect to the fixing member 12 and the second and fourth axes A2 and A4 are movable with respect to the fixing member 12.

As is discussed above, the linkage mechanism 16 is preferably a four-bar linkage mechanism that is defined by the four rotational axes A1, A2, A3 and A4. A portion of the second link member 20 constitutes a first link bar B1 between the third and fourth axes A3 and A4. A portion of the first fink member 18 constitutes a second link bar B2 between the first and second axes A1 and A2. A portion of the chain guide 14 constitutes the third link bar B3 between the second and fourth axes A2 and A4. A portion of the fixing member 12 constitutes a fourth link bar B4 between the first and third axes A1 and A3. In this manner, the front derailleur 10 substantially includes the fixing member 12, chain guide 14, and linkage mechanism 16, thereby forming a four-bar linkage mechanism that links the fixing member 12 and the chain guide 14.

As shown in FIGS. 2 and 5, in a preferred embodiment, the first link member 18 includes a first arm 30 and a second arm 32 that both extend between the first and second axes A1 and A2, respectively. The biasing member 24 is disposed between the first arm 30 and the second arm 32. Preferably, the first and second arms 30 and 32 are connected by a bridge member 34 that spans therebetween. As shown in FIG. 2, the bridge member 34 divides first and second arms 30 and 32 into a first upper ear 30a and a first lower ear 30b and a second upper ear 32a and a second lower ear 32b. The first and second upper ears 30a and 32a include pivot openings 36a and 36b, respectively, for receiving the pivot pin 26. The first and second lower ears 30b and 32b include pivot openings 36c and 36d, respectively, for receiving pivot pins 38. The chain guide 14 includes complementary pivot openings 36e and 36f therein that receive the pivot pin 26 (and at least partially defines the second axis A2) and allows pivoting of the first link member 18 with respect to the chain guide 14. The first clamp part 12a of fixing member 12 includes first and second attachment flanges 35a and 35b that include pivot openings 36g and 36h respectively. The pivot opening 36g receives one of the pivot pins 38 (and at least partially defines the first axis A1) and the pivot opening 36h receives the other of pivot pins 38 so as to allow pivoting of the first link member 18 with respect to the fixing member 12. In a preferred embodiment, first link member 18 includes a stop member 40 that is engaged by a first end 24a of the biasing member 24. As shown in FIG. 2, in a preferred embodiment, stop member 40 is positioned on an arm 40a being unitary with and fixed to the first upper ear 30a and the bridge member 34. However, stop member 40 can also extend from bridge member 34 or one of first or second arms 30 or 32.

The second link member 20 is rotatably supported on the fixing member 12 by a pivot pin 42 that extends through a pivot opening 36i in the second link member 20 and a pivot opening 36j in the fixing member 12 (and at least partially defines the third axis A3). This arrangement allows pivoting of the second link member 20 with respect to the fixing member 14. A pivot pin 44 extends through a pivot opening 36k in the second link member 20 and a pivot opening 36l in the chain guide 14 (and at least partially defines the fourth axis A4). This arrangement allows pivoting of the second link member 20 with respect to the chain guide 14.

The linkage mechanism 16 is preferably designed so that the biasing member 24, which is coaxial with the second axis A2, always urges the chain guide 14 in a transverse direction towards the frame of the bicycle. In other words, when the chain guide 14 is in the retracted position the chain is engaged with the chain rings of the chain ring assembly that is closest to the seat tube 100. When the linkage mechanism 16 moves the chain guide 14 in its extended position, the chain guide 14 is positioned proximate the outermost chain ring of the chain ring assembly, specifically, the chain ring that is the farthest from the seat tube 100. In another embodiment, the biasing member 24 can be coaxial with the first axis A1.

In a preferred embodiment, when the derailleur is mounted to a bicycle, the first axis A1 and the third axis A3 lie in a first plane that is approximately perpendicular to a center axis of the bicycle frame or the fixing member axis A5 when the front derailleur 10 is mounted on seat tube 100 of the bicycle frame. The second axis A2 and the fourth axis A4 lie in a second plane that is approximately perpendicular to the center axis of the bicycle frame or the fixing member axis A5 when the front derailleur 10 is mounted on seat tube 100 of the bicycle frame. Furthermore, the second axis 42 and the fourth axis A4 are movable in a direction that is approximately perpendicular to the fixing member axis A5.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. The term "mounted" or "mounting," as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "attached", "bonded", "fixed" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "forward," "inward," "downward," "upward," "above," "below," "vertical," "horizontal," and "transverse" as well as any other similar directional terms refer to those directions of a bicycle equipped with the bicycle front derailleur. Accordingly, these terms, as utilized to describe the bicycle front derailleur should be interpreted relative to a bicycle equipped with the bicycle front derailleur as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ä6, other aspects may likewise be embodied as a means-plus-function claim, or in other forms, such as being embodied in a computer-readable medium. (Any claims intended to be treated under 35 U.S.C. §112, ä6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A front derailleur comprising:
a fixing member that is configured to be fixed to a bicycle frame;
a chain guide movable between a retracted position and an extended position with respect to the fixing member;
a linkage mechanism coupling the chain guide to the fixing member, the linkage mechanism including a first link member being pivotable with respect to the fixing member about a first axis and being pivotable with respect to the chain guide about a second axis that is positioned above the first axis when the fixing member is fixed to the bicycle frame, and a second link member that is pivotable with respect to the fixing member about a third axis and that is pivotable with respect to the chain guide about a fourth axis that is positioned above the third axis when the fixing member is fixed to a bicycle frame, wherein the first link member and the second link member form a four bar linkage, and wherein the second axis is positioned between the fourth axis and the chain guide; and
a biasing member that biases the chain guide toward one of the retracted position and the extended position, the biasing member coaxially arranged around the second axis.

2. The front derailleur of claim 1 wherein the first link member includes a first arm and a second arm that both extend between the first and second axes respectively, and wherein the biasing member is disposed between the first arm and the second arm.

3. The front derailleur of claim 1 wherein the first axis and the third axis lie in a first plane that is approximately perpendicular to a center axis of the bicycle frame when the fixing member is fixed to the bicycle frame.

4. The front derailleur of claim 3 wherein the second axis and the fourth axis lie in a second plane, and wherein the second plane is approximately perpendicular to the center axis of the bicycle frame when the fixing member is fixed to the bicycle frame.

5. The front derailleur of claim 1 wherein the second link member has a cable fixing portion.

6. A front derailleur comprising:
a fixing member that is configured to be fixed to a bicycle frame;
a chain guide movable between a retracted position and an extended position with respect to the fixing member;
a linkage mechanism coupling the chain guide to the fixing member, the linkage mechanism including a first link member being pivotable with respect to the fixing member about a first axis and being pivotable with respect to the chain guide about a second axis that is positioned above the first axis when the fixing member is fixed to the bicycle frame, wherein the first link member includes a first arm and a second arm that both extend between the first and second axes respectively, wherein the linkage mechanism further includes a second link member that is pivotable with respect to the fixing member about a third axis and that is pivotable with respect to the chain guide about a fourth axis that is positioned above the third axis when the fixing member is fixed to a bicycle frame, wherein the first link member and the second link member form a four bar linkage, and wherein the second link member has a cable fixing portion, wherein the cable fixing portion is positioned between the second axis and the fourth axis in a generally horizontal direction; and a biasing member that biases the chain guide toward one of the retracted position and the extended position, the biasing member coaxially arranged around the second axis, wherein the biasing member is disposed between the first arm and the second arm.

7. The front derailleur of claim 1 wherein the first link member includes a stop member that is engaged by a first end of the biasing member.

8. The front derailleur of claim 1 wherein the biasing member biases the chain guide toward the retracted position.

9. A front derailleur comprising:
a fixing member that is configured to be fixed to a bicycle frame, wherein the fixing member defines a fixing member axis;
a chain guide movable between a retracted position and an extended position with respect to the fixing member;
a linkage mechanism coupling the chain guide to the fixing member, the linkage mechanism including a first link member being pivotable with respect to the fixing member about a first axis and being pivotable with respect to the chain guide about a second axis that is positioned above the first axis when the fixing member is fixed to the bicycle frame, the first link member having a first arm and a second arm that both extend between the first and second axes respectively, the linkage mechanism further including a second link member that is pivotable with respect to the fixing member about a third axis and that is pivotable with respect to the chain guide about a fourth axis that is positioned above the third axis when the fixing member is fixed to a bicycle frame, wherein the first link member and the second link member form a four bar linkage, and wherein the second axis is positioned between the fourth axis and the chain guide; and
a biasing member that biases the chain guide toward one of the retracted position and the extended position, the biasing member disposed between the first arm and the second arm and coaxially around one of the first axis or the second axis.

10. The front derailleur of claim 9 wherein the first axis and the third axis lie in a first plane that is approximately perpendicular to a center axis of the bicycle frame when the fixing member is fixed to the bicycle frame.

11. The front derailleur of claim 10 wherein the second axis and the fourth axis lie in a second plane, and wherein the second plane is approximately perpendicular to the center axis of the bicycle frame when the fixing member is fixed to the bicycle frame.

12. The front derailleur of claim 9 wherein the second link member has a cable fixing portion.

13. A front derailleur comprising:
a fixing member that is configured to be fixed to a bicycle frame, wherein the fixing member defines a fixing member axis;
a chain guide movable between a retracted position and an extended position with respect to the fixing member;
a linkage mechanism coupling the chain guide to the fixing member, the linkage mechanism including a first link member being pivotable with respect to the fixing member about a first axis and being pivotable with respect to the chain guide about a second axis that is positioned above the first axis when the fixing member is fixed to the bicycle frame, the first link member having a first arm and a second arm that both extend between the first and second axes respectively, wherein the linkage mechanism further includes a second link member that is pivotable with respect to the fixing member about a third axis and that is pivotable with respect to the chain guide about a fourth axis that is positioned above the third axis when the fixing member is fixed to a bicycle frame, wherein the first link member and the second link member form a four bar linkage, wherein the second link member has a cable fixing portion, wherein the cable fixing portion is positioned between the second axis and the fourth axis in a generally horizontal direction; and
a biasing member that biases the chain guide toward one of the retracted position and the extended position, the biasing member disposed between the first arm and the second arm and coaxially around one of the first axis or the second axis.

14. The front derailleur of claim 9 wherein the biasing member is coaxially arranged around the second axis.

15. The front derailleur of claim 9 wherein the first link member includes a stop member that is engaged by a first end of the biasing member.

16. The front derailleur of claim 9 wherein the biasing member biases the chain guide toward the retracted position.

* * * * *